US011835304B2

(12) United States Patent
Vargas et al.

(10) Patent No.: US 11,835,304 B2
(45) Date of Patent: Dec. 5, 2023

(54) HEAT EXCHANGER WITH STACKED FLOW CHANNEL MODULES

(71) Applicant: Raytheon Technologies Corporation, Farmington, CT (US)

(72) Inventors: Chris Vargas, West Hartford, CT (US); Daniel B. Denis, Simsbury, CT (US)

(73) Assignee: RTX CORPORATION, Farmington, CT (US)

(*) Notice: Subject to any disclaimer, the term of this patent is extended or adjusted under 35 U.S.C. 154(b) by 343 days.

(21) Appl. No.: 17/086,928

(22) Filed: Nov. 2, 2020

(65) Prior Publication Data

US 2021/0071962 A1 Mar. 11, 2021

Related U.S. Application Data

(62) Division of application No. 15/633,169, filed on Jun. 26, 2017, now Pat. No. 10,823,511.

(51) Int. Cl.
*F28D 9/00* (2006.01)
*F28F 1/42* (2006.01)
(Continued)

(52) U.S. Cl.
CPC ........... *F28D 9/0093* (2013.01); *B21D 53/04* (2013.01); *B23P 15/26* (2013.01); *F01D 25/08* (2013.01); *F28D 1/0308* (2013.01); *F28D 1/05366* (2013.01); *F28D 9/0031* (2013.01); *F28F 1/16* (2013.01); *F28F 1/26* (2013.01);
(Continued)

(58) Field of Classification Search
CPC .... F28D 9/0093; F28D 9/0031; F28D 9/0062; F28D 9/0081; F28D 1/0308; F28D 1/05366; F28D 1/0316; F28D 7/0041; B21D 53/04; B23P 15/26; F01D 25/08; F28F 1/16; F28F 1/26; F28F 1/42; F28F 1/422; F28F 9/02; F28F 2001/428; F28F 3/04; F28F 3/044; F28F 3/08; F28F 2215/00; F28F 2215/04; F05D 2220/32; F05D 2220/311; F05D 2220/31; F05D 2220/53
See application file for complete search history.

(56) References Cited

U.S. PATENT DOCUMENTS

| 1,662,870 A | 3/1928 | Stancliffe |
| 3,800,868 A | 4/1974 | Berkowitz |

(Continued)

*Primary Examiner* — Travis Ruby
(74) *Attorney, Agent, or Firm* — GETZ BALICH LLC

(57) ABSTRACT

A heat exchanger is provided for a gas turbine engine. This heat exchanger includes a pair of heat exchanger manifolds and a stack of flow channel modules arranged and fluidly coupled between the heat exchanger manifolds. The flow channel modules include a first flow channel module that includes a first heat exchanger section and a second heat exchanger section. The first heat exchanger section includes a base plate, a plurality of flow channel walls and a plurality of heat transfer augmentors. The flow channel walls project out from the base plate to the second heat exchanger section thereby forming a plurality of flow channels between the first heat exchanger section and the second heat exchanger section. The heat transfer augmentors project partially into at least one of the flow channels. A first of the heat transfer augmentors is formed from a different material than the base plate.

16 Claims, 7 Drawing Sheets

(51) Int. Cl.
  *F28D 1/03* (2006.01)
  *F28F 1/26* (2006.01)
  *F28F 1/16* (2006.01)
  *F28D 1/053* (2006.01)
  *B21D 53/04* (2006.01)
  *B23P 15/26* (2006.01)
  *F01D 25/08* (2006.01)
  *F28F 9/02* (2006.01)

(52) U.S. Cl.
  CPC ............ *F28F 1/42* (2013.01); *F28F 1/422* (2013.01); *F28F 9/02* (2013.01); *F05D 2220/32* (2013.01); *F05D 2230/311* (2013.01)

(56) References Cited

U.S. PATENT DOCUMENTS

| | | |
|---|---|---|
| 4,064,300 A | 12/1977 | Bhangu |
| 4,310,960 A | 1/1982 | Parker |
| 4,401,155 A | 8/1983 | Royal |
| 4,417,615 A | 11/1983 | Stockman |
| 4,503,908 A | 3/1985 | Rosman |
| 4,516,632 A | 5/1985 | Swift |
| 4,632,019 A | 12/1986 | Whiteman |
| 4,749,032 A | 6/1988 | Rosman |
| 4,771,826 A | 9/1988 | Grehier |
| 4,977,956 A * | 12/1990 | Aoki .................. F28D 1/05366 165/174 |
| 5,476,141 A | 12/1995 | Tanaka |
| 5,584,341 A | 12/1996 | Sabin |
| 5,626,188 A | 5/1997 | Dewar |
| 5,697,433 A | 12/1997 | Kato |
| 5,784,776 A | 7/1998 | Saito |
| 5,799,727 A | 9/1998 | Liu |
| 5,826,646 A | 10/1998 | Bae |
| 5,833,389 A | 11/1998 | Sirovich |
| 5,851,636 A | 12/1998 | Lang |
| 5,931,226 A | 8/1999 | Hirano |
| 5,947,365 A | 9/1999 | Tanaka |
| 6,347,662 B1 | 2/2002 | Davidian |
| 6,364,006 B1 | 4/2002 | Halt |
| 6,510,870 B1 | 1/2003 | Valaszkai |
| 6,907,920 B2 | 6/2005 | Warburton |
| 7,398,641 B2 | 7/2008 | Stretton |
| 8,381,803 B2 | 2/2013 | Kim |
| 8,550,151 B2 | 10/2013 | Murayama |
| 8,616,269 B2 | 12/2013 | Besant |
| 8,894,367 B2 | 11/2014 | Lee |
| 8,951,004 B2 | 2/2015 | Lee |
| 9,452,407 B2 | 9/2016 | Tonkovich |
| 2001/0006105 A1 | 7/2001 | Watanabe |
| 2001/0018140 A1 | 8/2001 | Hermann |
| 2002/0112846 A1 | 8/2002 | Noda |
| 2004/0031592 A1 | 2/2004 | Mathias |
| 2004/0069477 A1 | 4/2004 | Nishikawa |
| 2005/0081379 A1 | 4/2005 | Askani |
| 2005/0098309 A1 | 5/2005 | Kang |
| 2006/0124283 A1 | 6/2006 | Abi-Akar |
| 2007/0137843 A1 | 6/2007 | Gievers |
| 2008/0149313 A1 | 6/2008 | Slaughter |
| 2009/0032232 A1 | 2/2009 | Murayama |
| 2009/0047994 A1 | 2/2009 | Sommer |
| 2009/0071638 A1 | 3/2009 | Murayama |
| 2009/0145581 A1 | 6/2009 | Hoffman |
| 2009/0211977 A1 | 8/2009 | Miller |
| 2009/0263598 A1 | 10/2009 | Irwin |
| 2010/0051248 A1 | 3/2010 | Inatomi |
| 2012/0090822 A1 | 4/2012 | Francois |
| 2013/0020063 A1 | 1/2013 | Fetvedt |
| 2013/0260119 A1 | 10/2013 | Litton |
| 2014/0242900 A1 | 8/2014 | Takada |
| 2015/0053381 A1 | 2/2015 | Takada |
| 2015/0179287 A1 | 6/2015 | Castanie |
| 2015/0241142 A1 | 8/2015 | Vallee |
| 2015/0300754 A1 | 10/2015 | Vandermeulen |
| 2015/0361922 A1 | 12/2015 | Alvarez |
| 2016/0014929 A1 | 1/2016 | Jaworowski |
| 2016/0033129 A1 | 2/2016 | Burd |
| 2016/0109190 A1 | 4/2016 | Olesen |
| 2016/0146552 A1 | 5/2016 | Tutunoglu |
| 2016/0152005 A1 | 6/2016 | Roach |
| 2016/0209123 A1 | 7/2016 | Yee |
| 2016/0230595 A1 | 8/2016 | Wong |
| 2016/0251975 A1 | 9/2016 | Strock |
| 2017/0010047 A1 | 1/2017 | Lv |
| 2017/0023311 A1 | 1/2017 | Urbanski |

\* cited by examiner

HEAT EXCHANGER WITH STACKED FLOW CHANNEL MODULES

This application is a divisional of U.S. patent application Ser. No. 15/633,169 filed Jun. 26, 2017, which is hereby incorporated herein by reference in its entirety.

BACKGROUND OF THE INVENTION

1. Technical Field

This disclosure relates generally to a heat exchanger and, more particularly, to methods for manufacturing a heat exchanger and heat exchangers manufactured by, for example, such methods.

2. Background Information

A gas turbine engine may include a heat exchanger for conditioning relatively hot air with relatively cold/mild air bled from, for example, a bypass gas path. Various types of heat exchangers and various methods for forming such heat exchangers are known in the art. While these known heat exchanger configurations and formation methods have various advantages, there is still room in the art for improvement. For example, there may be little to no visual access to internal flow channel surfaces of a prior art heat exchanger for inspection. Therefore, destructive sampling of one or more modules of the heat exchanger may be performed to enable visual inspection of some of the internal flow channel surfaces. In addition or alternatively, the modules may be inspected by relatively expensive and time consuming non-destructive inspection processes that may not have certain geometry or accessibility for successful inspection. Therefore, there is a need in the art for a heat exchanger which can be manufactured to enable, inter alia, visual inspection during the manufacturing thereof.

SUMMARY OF THE DISCLOSURE

According to an aspect of the present disclosure, a method is provided for manufacturing at least a portion of a heat exchanger. During this method, a first heat exchanger section is formed that includes a base and a plurality of protrusions. The forming of the first heat exchanger section includes building up at least one protrusion material on the base to form the protrusions. The first heat exchanger section is attached to a second heat exchanger section. A plurality of flow channels are defined between the first heat exchanger section and the second heat exchanger section.

According to another aspect of the present disclosure, a manufacturing method is provided. During this method, a first heat exchanger plate is formed configured with a first base plate and a plurality of first protrusions. The forming of the first heat exchanger plate includes cast or wrought base material to form the first base plate and thereafter building up at least one protrusion material on the first base plate to form the first protrusions, where the at least one protrusion material is different from the base material. A second heat exchanger plate is formed. The first heat exchanger plate is bonded to a second heat exchanger plate. A plurality of flow channels are defined between the first heat exchanger plate and the second heat exchanger plate. The bonded first and second heat exchanger plates are assembled with other components to provide a heat exchanger.

According to still another aspect of the present disclosure, a heat exchanger is provided for a gas turbine engine. This heat exchanger includes a pair of heat exchanger manifolds and a stack of flow channel modules arranged and fluidly coupled between the heat exchanger manifolds. The flow channel modules include a first flow channel module that includes a first heat exchanger section and a second heat exchanger section. The first heat exchanger section includes a base plate, a plurality of flow channel walls and a plurality of heat transfer augmentors. The flow channel walls project out from the base plate to the second heat exchanger section thereby forming a plurality of flow channels between the first heat exchanger section and the second heat exchanger section. The heat transfer augmentors project partially into at least one of the flow channels. A first of the heat transfer augmentors is formed from a different material than the base plate.

The first heat exchanger section may be configured as or otherwise include a first heat exchanger plate. In addition or alternatively, the second heat exchanger section may be configured as or otherwise include a second heat exchanger plate.

The building up of the at least one protrusion material on the base to form at least one of the protrusions may be performed using one or more of the following processes: an additive manufacturing process, a thermal spraying process, and a plating process.

The method may further include cast or wrought base material to form the base.

The attaching of the first heat exchanger section to the second heat exchanger section may include bonding the first heat exchanger section to the second heat exchanger section.

At least a first of the protrusions may be configured as a heat transfer augmentor that projects partially into a first of the flow channels from the base.

The heat transfer augmentor may be configured as an elongated protrusion.

The heat transfer augmentor may be configured as a point protrusion.

A first of the protrusions may be configured as a first type of heat transfer augmentor. A second of the protrusions may be configured as a second type of heat transfer augmentor that is different than the first type of heat transfer augmentor.

The at least one protrusion material may include first protrusion material and second protrusion material that is different from the first protrusion material. A first of the protrusions may be formed from the first protrusion material. A second of the protrusions may be formed from the second protrusion material.

A first of the protrusions may be configured as at least a portion of a flow channel wall that at least partially defines a side of a first of the flow channels.

A second of the protrusions may be configured as a heat transfer augmentor that projects partially into the first of the flow channels from the base.

The base may include base material that is different than the at least one protrusion material.

The method may further include forming the second heat exchanger section. The second heat exchanger section may include a second base and a plurality of second protrusions. The forming of the second heat exchanger section may include building up at least one protrusion material on the second base to form the second protrusions.

The attaching of the first heat exchanger section to the second heat exchanger section may include bonding at least one of the protrusions to a respective one of the second protrusions.

The first heat exchanger section may further include a plurality of second protrusions. The base may be between the second protrusions and the protrusions. The forming of the first heat exchanger section may further include building up at least one protrusion material on the base to form the second protrusions.

During the method, a plurality of flow channel modules may be provided, where a first of the flow channel modules may include the first heat exchanger section and the second heat exchanger section. The flow channel modules may be arranged into a stack. The stack of the flow channel modules may be configured with one or more heat exchanger manifolds to provide the heat exchanger.

The flow channels may be adapted to flow fluid, having a temperature greater than 1000 degrees Fahrenheit during heat exchanger operation.

The plurality of flow channels may be defined between the first heat exchanger section and the second heat exchanger section to combine and make a heat exchanger module.

The foregoing features and the operation of the invention will become more apparent in light of the following description and the accompanying drawings.

DETAILED DESCRIPTION OF THE INVENTION

The present disclosure includes methods for manufacturing one or more portions of a heat exchanger, methods for manufacturing an entire heat exchanger as well as a heat exchanger manufactured by, for example, the disclosed methods. An exemplary embodiment of such a heat exchanger 20 is illustrated in FIG. 1.

The exemplary heat exchanger 20 may be configured for a gas turbine engine of an aircraft propulsion system. Examples of such a gas turbine engine include, but are not limited to, a turbofan gas turbine engine, a turbojet gas turbine engine, a pusher fan gas turbine engine and a propfan gas turbine engine. The present disclosure, however, is not limited to aircraft propulsion system applications. For example, the gas turbine engine may alternatively be configured as an auxiliary power unit (APU) for an aircraft system, an industrial gas turbine engine or any other type of gas turbine engine. Furthermore, the present disclosure is not limited to gas turbine engine applications. For example, the heat exchanger 20 can alternatively be configured for any other device/system that utilizes a heat exchanger.

The heat exchanger 20 may be configured as an air-to-air heat exchanger. The present disclosure, however, is not limited to such an air-to-air configuration. For example, the heat exchanger 20 may alternatively be configured as an air-to-liquid heat exchanger or a liquid-to-liquid heat exchanger.

Figure 1:
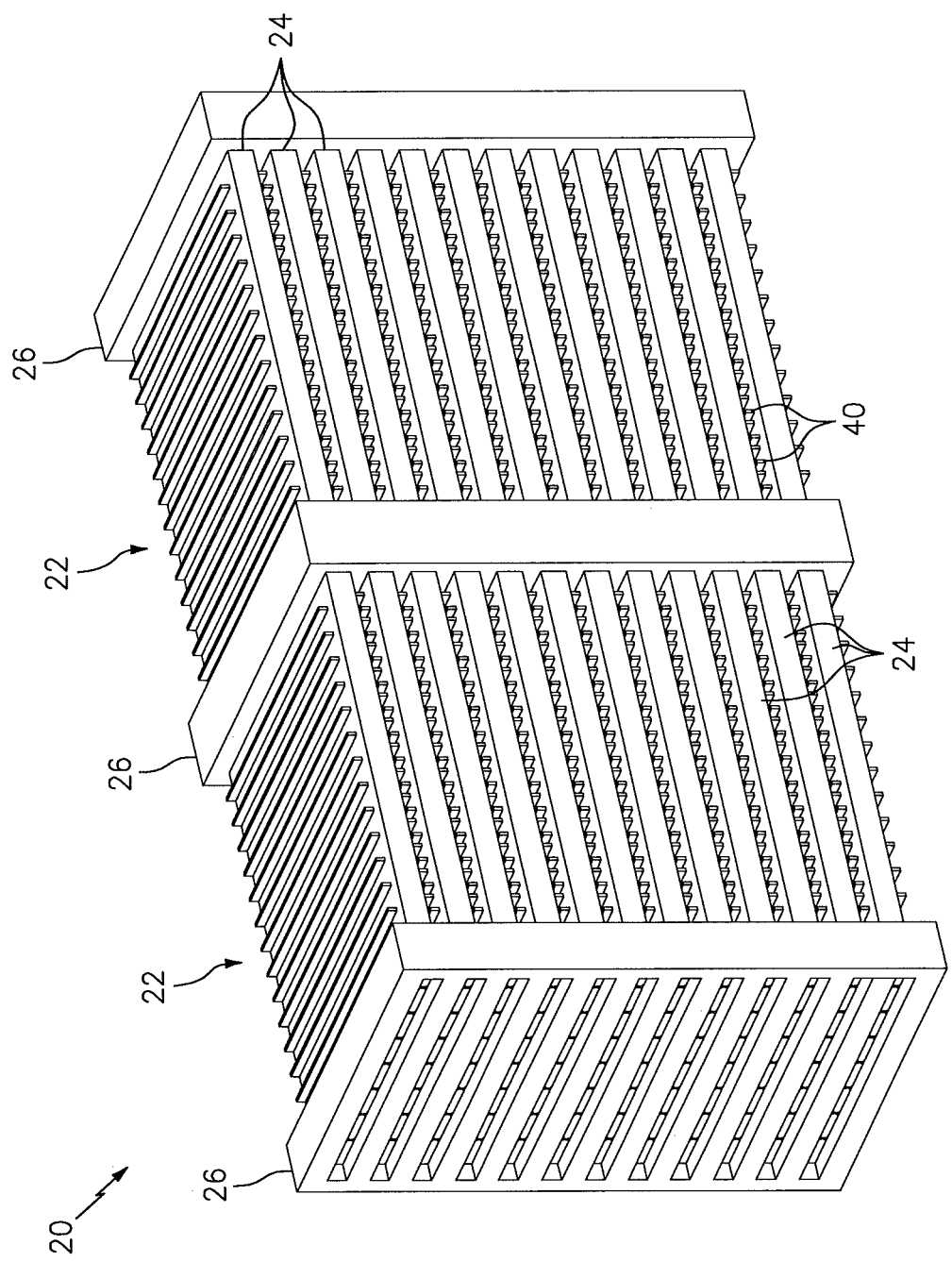
FIG. 1 is a perspective illustration of a heat exchanger for a gas turbine engine.

The heat exchanger 20 of FIG. 1 includes one or more arrays 22 (e.g., stacks) of flow channel modules 24 and one or more heat exchanger manifolds 26. Each of the arrays 22 of the flow channel modules 24 in FIG. 1 extends between and is fluidly coupled with an adjacent pair of the manifolds 26. Each of the arrays 22 includes one or more of the flow channel modules 24; e.g., a stack of the flow channel modules 24.

Figure 2:
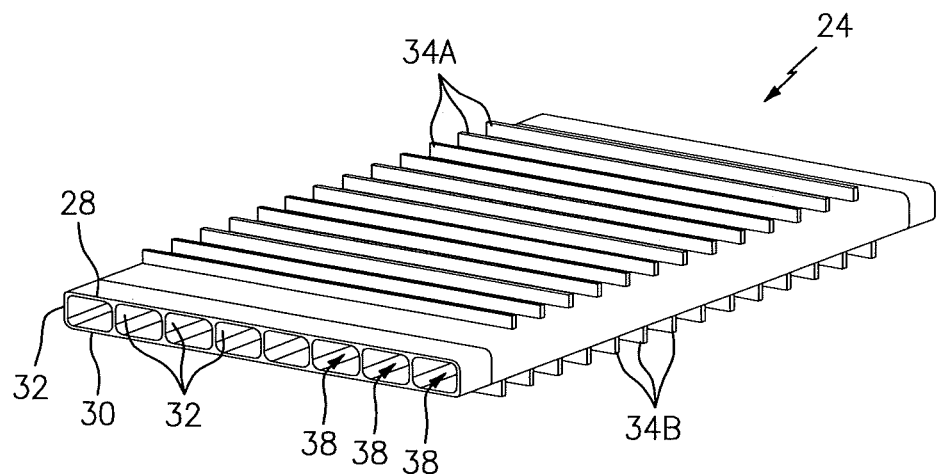
FIG. 2 is a perspective illustration of a flow channel module for the heat exchanger.

FIG. 2 illustrates an exemplary one of the flow channel modules 24. This exemplary flow channel module 24 includes a first base 28, a second base 30, one or more flow channel walls 32 (e.g., sidewalls) and one or more heat transfer augmentors 34A and 34B (generally referred to as 34), 35A and 35B (generally referred to as 35), and 36A and 36B (generally referred to as 36); see also FIG. 3. The flow channel module 24 is also configured with one or more first flow channels 38. Each of these first flow channels 38 extends longitudinally through the flow channel module 24. Each of the first flow channels 38 is defined vertically between the first base 28 and the second base 30 and defined laterally between an adjacent pair of the flow channel walls 32, where each wall 32 extends vertically between and is (e.g., directly) connected to the first base 28 and the second base 30.

Each of the heat transfer augmentors 34-36 is configured to enhance heat transfer between a material mass of the flow channel module 24 and the fluid (e.g., air) contacting and flowing past the material mass. For example, the heat transfer augmentors of FIG. 2 include one or more external heat transfer augmentors 34 and one or more internal heat transfer augmentors 35 and 36, which augmentors 34 and augmentors 35-36 are disposed on opposite sides of the respective base 28, 30.

The external heat transfer augmentors 34 of FIG. 2 are configured as fins. Each of these fins projects vertically out from a respective one of the bases 28, 30 and extends substantially completely (or partially) laterally across a lateral width of that same respective base 28, 30. In addition to enhancing heat transfer, these fins may also or alternatively form partial (or alternatively full) walls for second flow channels 40 defined between vertically adjacent flow channel modules 24 in the stack; e.g., see FIG. 1.

Figure 3:
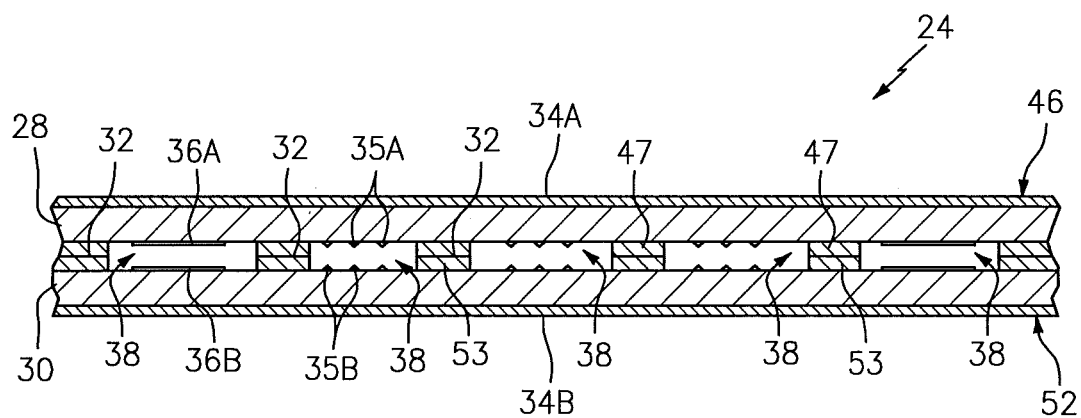
FIG. 3 is a cross-sectional illustration of a portion of the flow channel module.

Referring to FIG. 3, the internal heat transfer augmentors 35 and 36 are configured as protrusions. Each of the protrusions projects partially into (or completely through) a respective one of the first flow channels 38 from a respective one of the bases 28, 30 to a distal and/or unsupported end.

Figure 4:
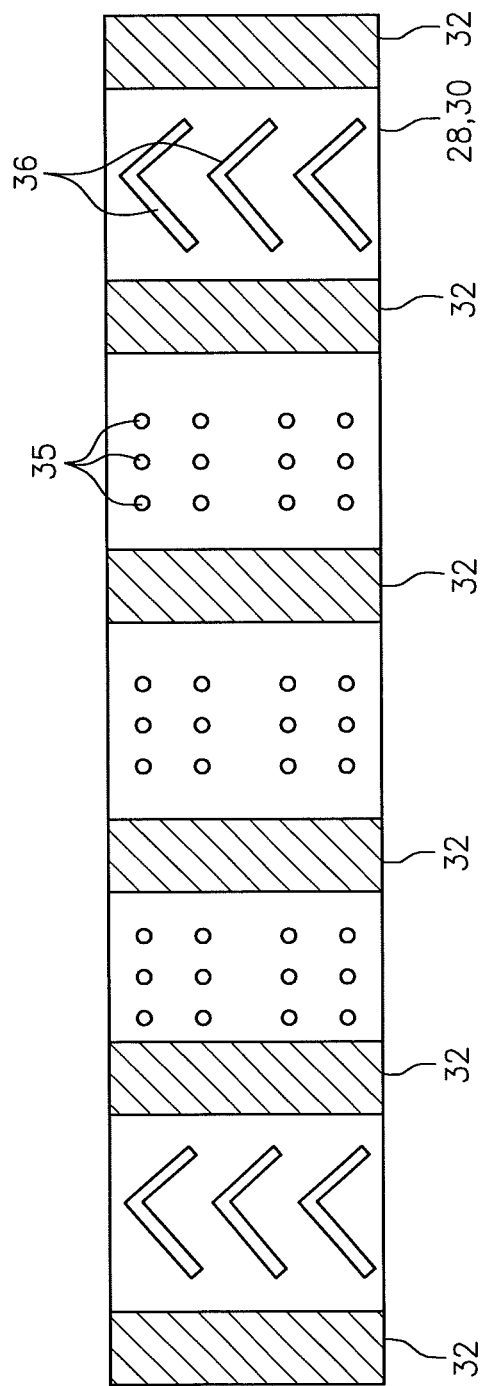
FIG. 4 is a sectional illustration of the flow channel module portion.

Referring to FIG. 4, one or more of the protrusions (e.g. 35) are configured as a first type of heat transfer augmentor and one or more of the protrusions (e.g. 36) are configured as a second type of heat transfer augmentor that is different than the first type of heat transfer augmentor. For example, the internal heat transfer augmentors 35 are configured as point protrusions such as, but not limited to, hemispheres, cones or other types of pedestals. The internal heat transfer augmentors 36 are configured as elongated protrusions such as, but not limited to, trip strips, straight ribs, chevron-shaped ribs or other types of ribs. Of course, the present disclosure is not limited to including two different types of heat transfer augmentors. For example, in other embodiments, there may be more than two types of protrusion configurations or alternatively all of the protrusions may have a common configuration.

In the embodiment of FIG. 4, the internal heat transfer augmentors 35 and the internal heat transfer augmentors 36 may be located in different first flow channels 38 such that the different types of augmentors are not in a common flow channel. However, in other embodiments, one of the more of the first flow channels 38 may include more than one type of heat transfer augmentor or other type of protrusion.

Figure 5:
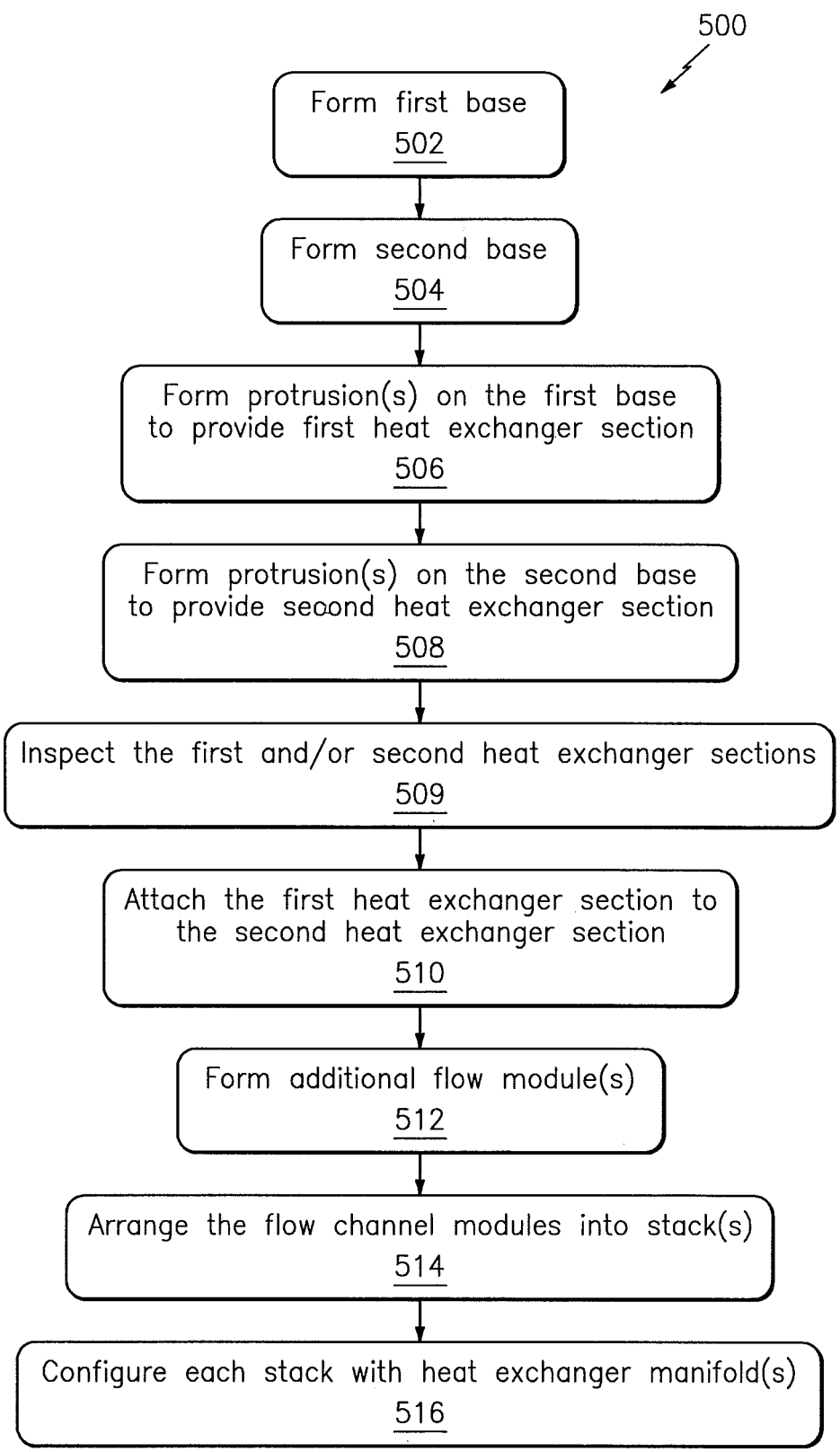
FIG. 5 is a flow diagram of a method for manufacturing a heat exchanger such as the heat exchanger of FIG. 1.

FIG. 5 is a flow diagram of a method 500 for manufacturing a heat exchanger. For ease of description, the heat exchanger referenced below is the heat exchanger 20 described above with respect to FIGS. 1-4. However, the method 500 is not limited to manufacturing such an exemplary heat exchanger configuration nor limited to manufacturing a heat exchanger for a gas turbine engine application.

Figure 6:
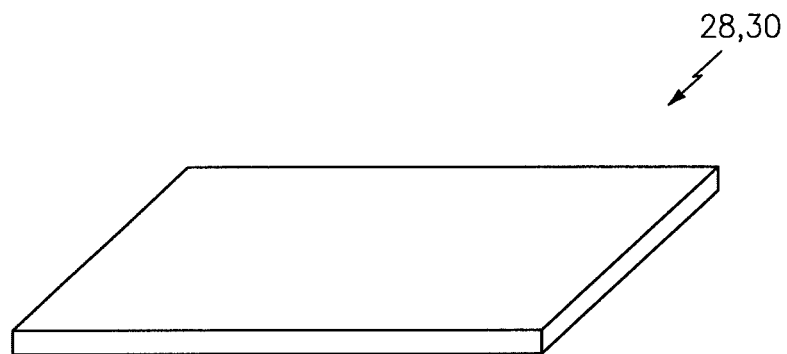
FIG. 6 is a perspective illustration of a base of a heat exchanger section.

In step 502, the first base 28 (e.g., a base plate) is formed or otherwise provided. For example, first base material may be cast in a mold to form the first base 28 as a casting. An exemplary embodiment of such a cast (or otherwise formed) base is illustrated in FIG. 6. In this exemplary embodiment, the first base 28 is configured as a substantially flat plate. However, the present disclosure is not limited to such an exemplary configuration. For example, in other embodiments, the first base 28 may be configured as a two-dimensionally or three-dimensionally curved plate. Furthermore, the present disclosure is not limited to forming the first base 28 via cast alloy. For example, in other embodiments, the first base 28 may also or alternatively be formed by wrought alloy and/or using machining and/or other manufacturing techniques.

An exemplary first base material is metal, which may be in the form of a pure metal or a metal alloy. Examples of such a first base material metal include, but are not limited to, copper, copper alloys, aluminum-bronze, nickel, nickel alloys, cobalt, cobalt alloys, titanium, titanium alloys, titanium aluminides, or stainless steel alloys. Of course, the first base material of the present disclosure is not limited to the foregoing exemplary metals or metals in general. For example, in other embodiments, the first base material may be a composite material.

In step 504, the second base 30 (e.g., a base plate) is formed or otherwise provided. For example, second base material may be cast in a mold to form the second base 30 as a casting. An exemplary embodiment of such a cast (or otherwise formed) base is illustrated in FIG. 6. In this exemplary embodiment, the second base 30 is configured as a substantially flat plate. However, the present disclosure is not limited to such an exemplary configuration. For example, in other embodiments, the second base 30 may be configured as a two-dimensionally or three-dimensionally curved plate. Furthermore, the present disclosure is not limited to forming the second base 30 via casting. For example, in other embodiments, the second base 30 may also or alternatively be formed using machining and/or other manufacturing techniques.

An exemplary second base material is metal, which may be in the form of a pure metal or a metal alloy. Examples of such a second base material metal include, but are not limited to, copper, copper alloys, aluminum-bronze, nickel, nickel alloys, cobalt, cobalt alloys, titanium, titanium alloys, titanium aluminides, or stainless steel alloys. Of course, the second base material of the present disclosure is not limited to the foregoing exemplary metals or metals in general. For example, in other embodiments, the second base material may be a composite material. In some embodiments, the second base material may be the same as the first base material. In other embodiments, the second base material may be different than the first base material.

Figure 7:
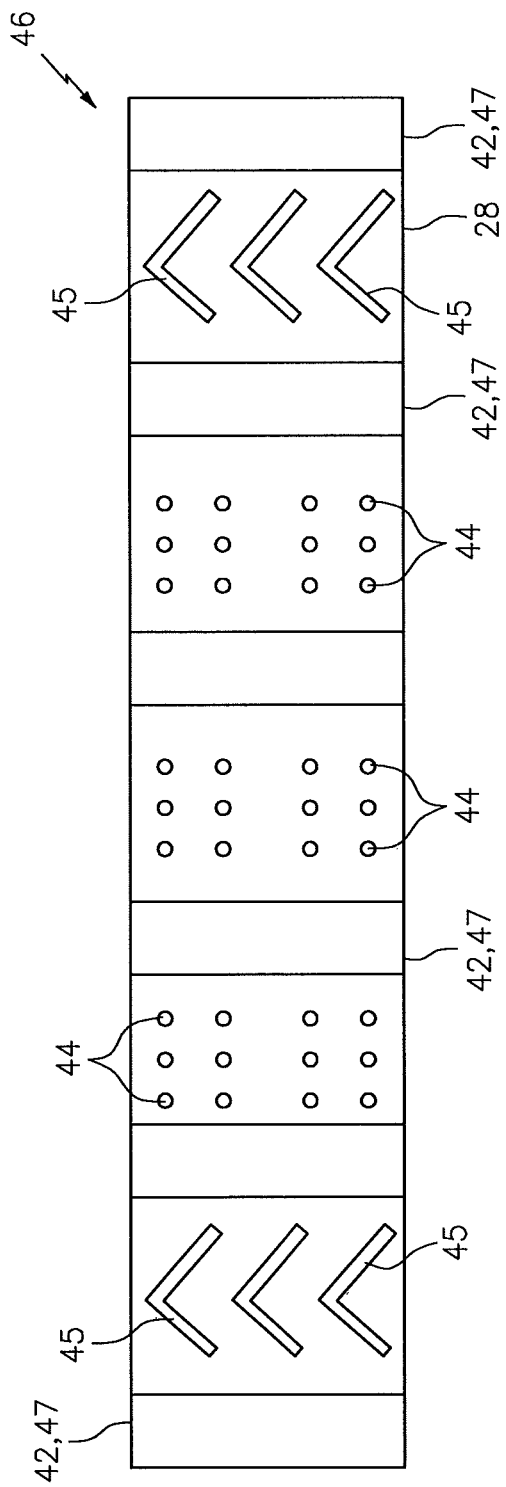
FIG. 7 is an illustration of an interior face of a portion of a first heat exchanger section.
Figure 8:
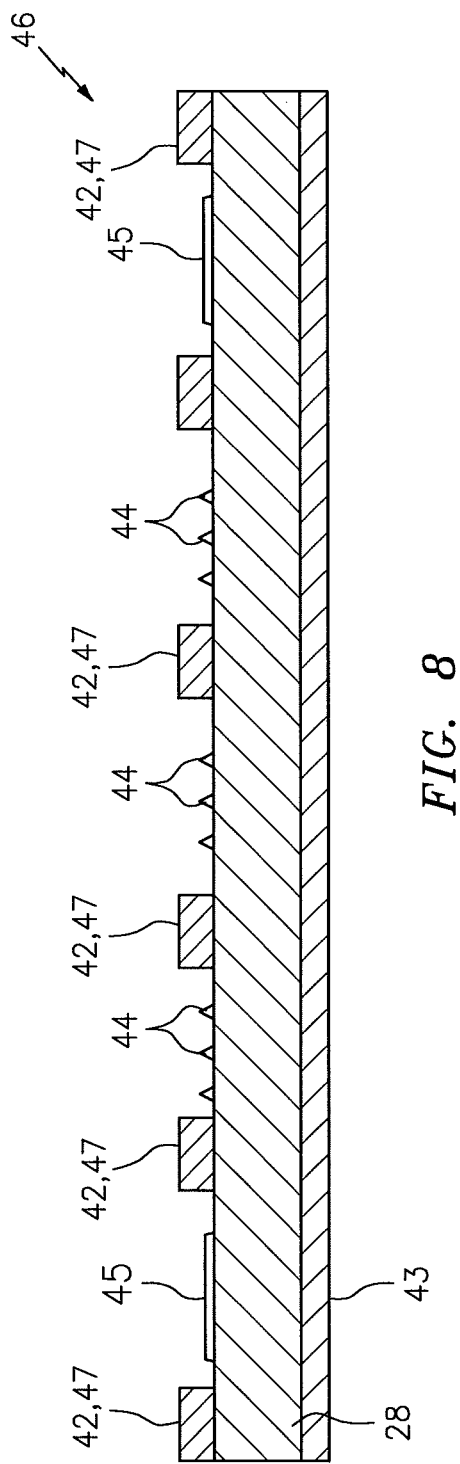
FIG. 8 is an illustration of the first heat exchanger section portion.

In step 506, one or more protrusions 42-45 are formed on the first base 28 to provide a first heat exchanger section 46 (e.g., plate) as shown in FIGS. 7 and 8. More particularly, at least one protrusion material is built up on the first base 28 to form the protrusions 42-45. The protrusion material(s) may be built up using one or more material buildup techniques that include, but are not limited to, an additive manufacturing process, a thermal spraying process and a plating process. Examples of an additive manufacturing process include, but are not limited to, cold metal transfer (CMT), wire arc additive manufacturing (WAAM), laser powder deposition and laser wire deposition. Examples of a thermal spraying process include, but are not limited to, cold spraying and high velocity oxy-fuel (HVOF) spraying. Examples of a plating process include, but are not limited to, electrolytic plating and electroless plating. Notably, the foregoing exemplary material buildup processes are different and distinct from a non-material buildup process such as attaching one solid body to another solid body to add a feature; e.g., welding a rib onto a plate.

The protrusions 42-45 are formed on the first base 28 to provide one or more or each of the following features: portions 47 (e.g., halve) of the flow channel walls 32, the external heat transfer augmentors 34A and the internal heat transfer augmentors 35A and 36A. However, in other embodiments, one or more (but not all) of these protrusions 42-45 may be integral with the first base 28. For example, the flow channel walls 32 (e.g., the wall portions 47) may be formed with the first base 28 during the step 502.

All of the protrusions 42-45 may be formed (i.e., built up) from a common protrusion material. Alternatively, one or more of the protrusions 42-45 may be formed from a first protrusion material while one or more others of the protrusions 42-45 may be formed from at least a second protrusion material that is different from the first protrusion material. For example, the flow channel walls 32 may be formed from the first protrusion material and the heat transfer augmentors 35A and 36A may be formed from the second protrusions material. The first protrusion material may be selected for enhanced bonding characteristics whereas the second protrusion material may be selected for enhanced heat transfer characteristics. In some embodiments, the first and the second protrusion materials may each be different from the first and/or the second base material. Alternatively, one of the protrusion materials (or the common protrusion material) may be the same as the first and/or the second base materials.

An example protrusion material is metal, which may be in the form of a pure metal or a metal alloy. Examples of such a protrusion material metal include, but are not limited to, copper, copper alloys, aluminum-bronze, nickel, nickel alloys, cobalt, cobalt alloys, titanium, titanium alloys, titanium aluminides, or stainless steel alloys. Of course, the protrusion material of the present disclosure is not limited to the foregoing exemplary metals or metals in general. For example, in other embodiments, the protrusion material may be a composite material.

Figure 9:
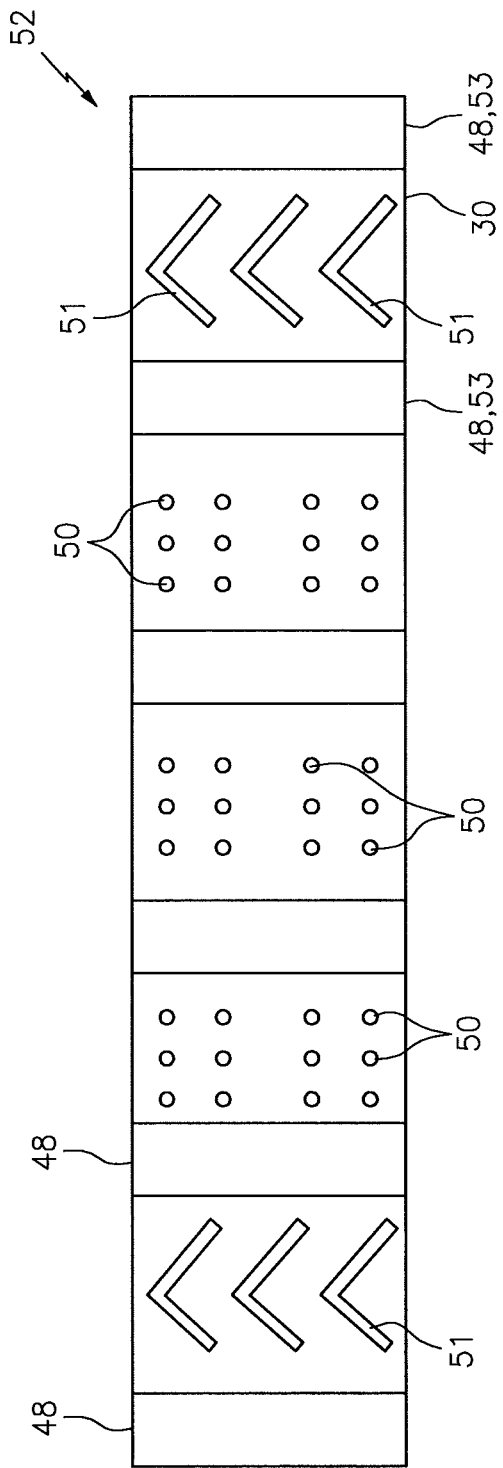
FIG. 9 is an illustration of an interior face of a portion of a second heat exchanger section.
Figure 10:
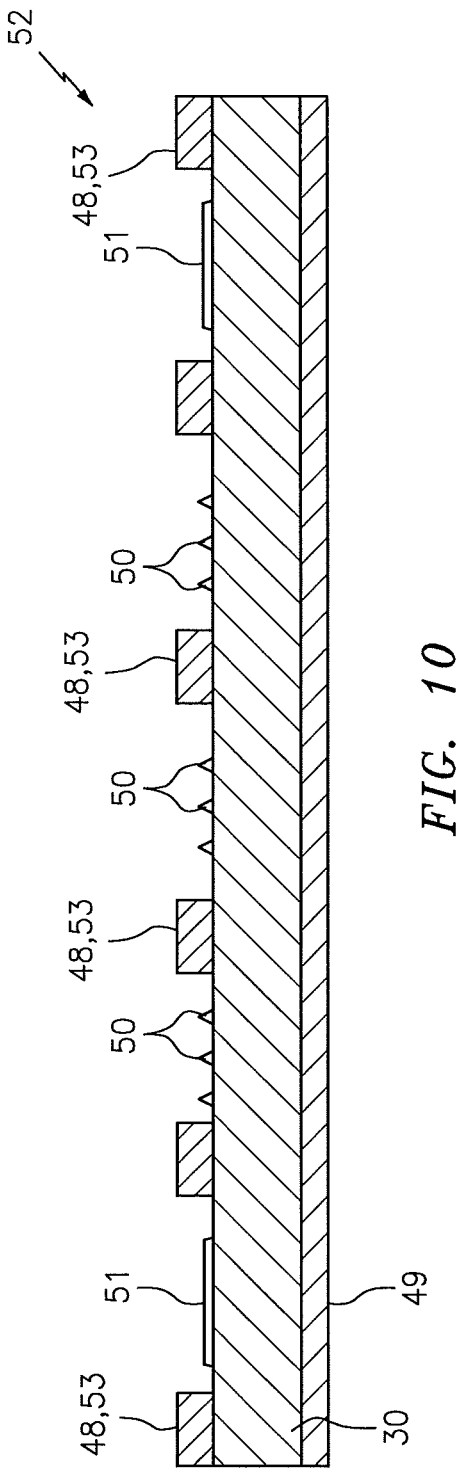
FIG. 10 is an illustration of the second heat exchanger section portion.

In step 508, one or more protrusions 48-51 are formed on the second base 30 to provide a second heat exchanger section 52 (e.g., plate) as shown in FIGS. 9 and 10. More particularly, at least one protrusion material is built up on the second base 30 to form the protrusions 48-51. The protrusion material(s) may be built up using one or more material buildup techniques that include, but are not limited to, an additive manufacturing process, a thermal spraying process, and a plating process as described above.

The protrusions 48-51 are formed on the second base 30 to provide one or more or each of the following features: portions 53 (e.g., halve) of the flow channel walls 32, the external heat transfer augmentors 34B and the internal heat transfer augmentors 35B and 36B. However, in other embodiments, one or more (but not all) of these protrusions 48-51 may be integral with the second base 30. For example, the flow channel walls 32 (e.g., the wall portions 53) may be formed with the second base 30 during the step 504.

All of the protrusions 48-51 may be formed (i.e., built up) from the common protrusion material. Alternatively, one or more of the protrusions 48-51 may be formed from the first protrusion material while one or more others of the protrusions 48-51 may be formed from the second protrusion material that is different from the first protrusion material. For example, the flow channel walls 32 may be formed from the first protrusion material and the heat transfer augmentors 34B, 35B and 36B may be formed from the second protrusions material.

In the present exemplary embodiment, the protrusions 42-45 and 48-51 are formed in the steps 506 and 508 from the same protrusion material(s). However, in other embodiments, one or more the protrusions 42-45 may be formed in the step 506 from a different material(s) than the protrusions 48-51 formed in the step 508.

In step 510, the first heat exchanger section 46 is attached to the second heat exchanger section 52 to provide one of the flow channel modules 24 as shown, for example, in FIGS. 2 and 3. For example, the first heat exchanger section 46 and, more particularly, the first flow channel wall portions 47 may be bonded to the second heat exchanger section 52 and, more particularly, the second flow channel wall portions 53, where each first flow channel wall portion 47 is aligned with a respective one of the second flow channel side wall portions 53. The bonding may be performed using one or more of the following exemplary, but non-limiting, techniques: a brazing technique, a transient liquid phase (TLP) bonding technique, and a diffusion bonding technique.

It is worth noting, forming the first heat exchanger section 46 as a discrete body from the second heat exchanger section 52 enables each heat exchanger section to be (e.g., visually) inspected prior to the step 510; e.g., during an inspection step 509. By contrast, if the heat exchanger sections 46 and 52 were formed integrally together during a single casting step, the interior thereof (e.g., the protrusions, the walls and the surfaces forming the channels 38) could not be inspected without cutting the body open or using expensive and time consuming non-destructive inspection processes.

In step 512, one or more of the other flow channel modules 24 may be formed or otherwise provided. For example, some or all of the steps 502, 504, 506, 508, 509 and 510 may be repeated one or more times to provide one or more additional flow channel modules 24.

In step 514, the flow channel modules 24 are arranged in one or more stacks as shown, for example, in FIG. 1. The flow channel modules 24 in each stack may be attached to one another. For example, the respective fins 34A and 34B may be attached together using a bonding technique as described, but not limited to, in the step 510.

In step 516, each stack of the flow channel modules 24 is configured with one or more of the heat exchanger manifolds 26 to provide the heat exchanger 20. For example, each stack of the flow channel modules 24 may be arranged and fluidly coupled between an adjacent pair of the heat exchanger manifolds 26.

The method 500 may include one or more additional steps than those described above. For example, in some embodiments, one or more apertures (e.g., dimples, recesses, crevices, gouges, etc.) may be machined or otherwise formed in the first base 28 and/or the second base 30. These apertures may be configured to further enhance heat transfer. In addition or alternatively, the channels 38 may be formed in the base 28, 30 to partially or completely define the respective flow channel walls 32, or wall portions 47, 53.

In some embodiments, the first heat exchanger section 46 may be substantially the same as (e.g., a mirror image of) the second heat exchanger section 52 as shown, for example, in FIG. 3. In other embodiments, the first heat exchanger section 46 may be different from the second heat exchanger section 52. For example, in the embodiment of FIG. 3, each flow channel wall portion 47, 53 defines a vertical portion of the respective flow channel(s) 38. However, in other embodiments, one set or subset of the flow channel wall portions 47, 53 may be omitted such that the other set of the flow channel wall portions completely vertically defines the respective flow channel(s) 38. In some embodiments, one of the heat exchanger sections 46, 52 may be formed without any heat transfer augmentors. In some embodiments, one of the heat exchanger sections 46, 52 may be formed with a different number and/or type(s) of heat transfer augmentors than the other one of the heat exchanger sections 52, 46.

Figure 11:
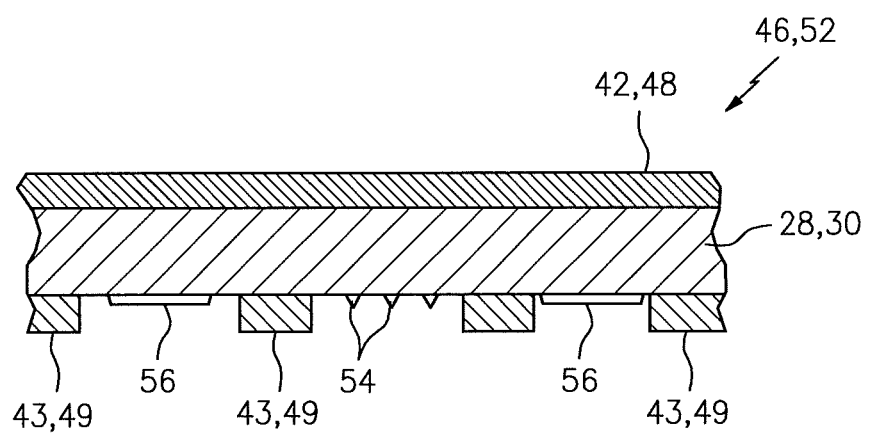
FIG. 11 is a side-sectional illustration of the flow channel module portion.

In some embodiments, one or more of the heat exchanger sections 46, 52 may each be configured with additional protrusions formed during the step 506, 508. For example, referring to FIG. 11, one or more heat transfer augmentors 54 and 56 may be formed between each (or select) adjacent pair of fins. Each of these heat transfer augmentors 54, 56 may be configured to project partially into (or completely through) a respective one of the second flow channels 40 from a respective one of the bases 28, 30 to a distal and/or unsupported end. One or more of the augmentors (e.g., 54) may be configured as point protrusions. One or more of the augmentors (e.g., 56) may be configured as elongated protrusions.

The heat exchanger 20 formed using the method 500 may be configured for a gas turbine engine. For such an application, the material(s) defining the flow channels can be subject to relatively high temperature fluids and, thus, are selected to withstand those high temperatures. For example, the heat exchanger 20 may be subject to fluid temperatures above 1000 degrees Fahrenheit; e.g., greater than 1300 degrees Fahrenheit.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A heat exchanger for a gas turbine engine, comprising:
a first heat exchanger manifold;
a second heat exchanger manifold; and a stack of flow channel modules arranged and fluidly coupled between the first heat exchanger manifold and the second heat exchanger manifold, the flow channel modules comprising a first flow channel module that includes a first heat exchanger section and a second heat exchanger section;

the first heat exchanger section including a base plate, a plurality of first fins, a plurality of flow channel walls and a plurality of heat transfer augmentors;

the first fins projecting out from a first side of the base plate;

the flow channel walls projecting out from a second side of the base plate, which is opposite the first side of the base plate, to the second heat exchanger section thereby forming a plurality of flow channels between the first heat exchanger section and the second heat exchanger section; and the heat transfer augmentors projecting out from the second side of the base plate partially into at least one of the flow channels;

wherein a first of the heat transfer augmentors is formed from a different material than the base plate;

wherein a first of the first fins overlaps a first of the flow channel walls at an intermediate location along the base plate;

wherein the base plate has a vertical thickness measured vertically from the first side of the base plate to the second side of the base plate at the intermediate location;

wherein the first of the first fins has a vertical height measured vertically from the first side of the base plate to a distal end of the first of the first fins at the intermediate location; and wherein the vertical thickness is greater than the vertical height.

2. The heat exchanger of claim 1, wherein the first of the flow channel walls is formed from a different material than the first of the heat transfer augmentors.

3. The heat exchanger of claim 2, wherein the first of the flow channel walls is formed from a different material than the base plate.

4. The heat exchanger of claim 1, wherein the first of the flow channel walls is formed from a different material than the base plate.

5. The heat exchanger of claim 1, wherein the first of the flow channel walls at least partially defines a side of a first of the flow channels.

6. The heat exchanger of claim 1, wherein the first heat exchanger section is attached to the second heat exchanger section.

7. The heat exchanger of claim 1, wherein the first heat exchanger section is bonded to the second heat exchanger section.

8. The heat exchanger of claim 1, wherein a first of the heat transfer augmentors is configured as an elongated protrusion.

9. The heat exchanger of claim 1, wherein a first of the heat transfer augmentors is configured as a point protrusion.

10. The heat exchanger of claim 1, wherein
a first of the heat transfer augmentors projects partially into a first of the flow channels, and the first of the heat transfer augmentors has a first configuration; and
a second of the heat transfer augmentors projects partially into a second of the flow channels, and the second of the heat transfer augmentors has a second configuration that is different than the first configuration.

11. The heat exchanger of claim 10, wherein different configurations of the heat transfer augmentors are not located within a common one of the flow channels.

12. The heat exchanger of claim 11, wherein
the first of the heat transfer augmentors is configured as an elongated protrusion; and
the second of the heat transfer augmentors is configured as a point protrusion.

13. The heat exchanger of claim 1, wherein a vertical height of a first of the flow channels between the first heat exchanger section and the second heat exchanger section is greater than the vertical height of the first of the first fins.

14. The heat exchanger of claim 1, wherein the first of the first fins is formed from a different material than the base plate.

15. The heat exchanger of claim 1, wherein
the flow channel modules further comprise a second flow channel module, and the second flow channel module includes a second base plate and a plurality of second fins; and
the second fins project out from a first side of the second base plate, and each of the second fins is attached to a respective one of the first fins.

16. The heat exchanger of claim 1, further comprising:
a third heat exchanger manifold; and
a second stack of the flow channel modules arranged and fluidly coupled between the second heat exchanger manifold and the third heat exchanger manifold.

* * * * *